Figure 1:
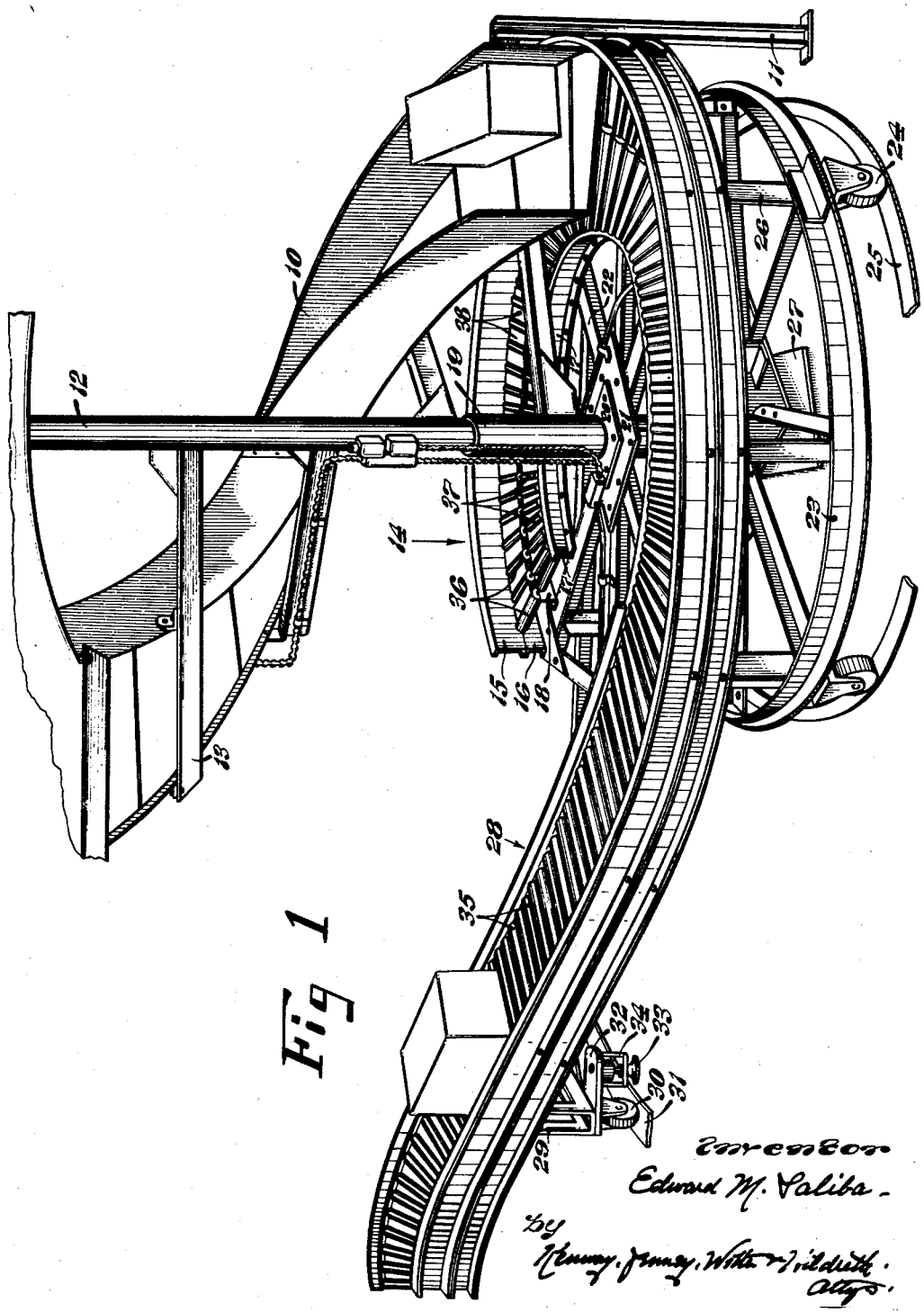

May 24, 1955 E. M. SALIBA 2,708,995
DISTRIBUTING CONVEYOR
Filed Nov. 10, 1950 2 Sheets-Sheet 1

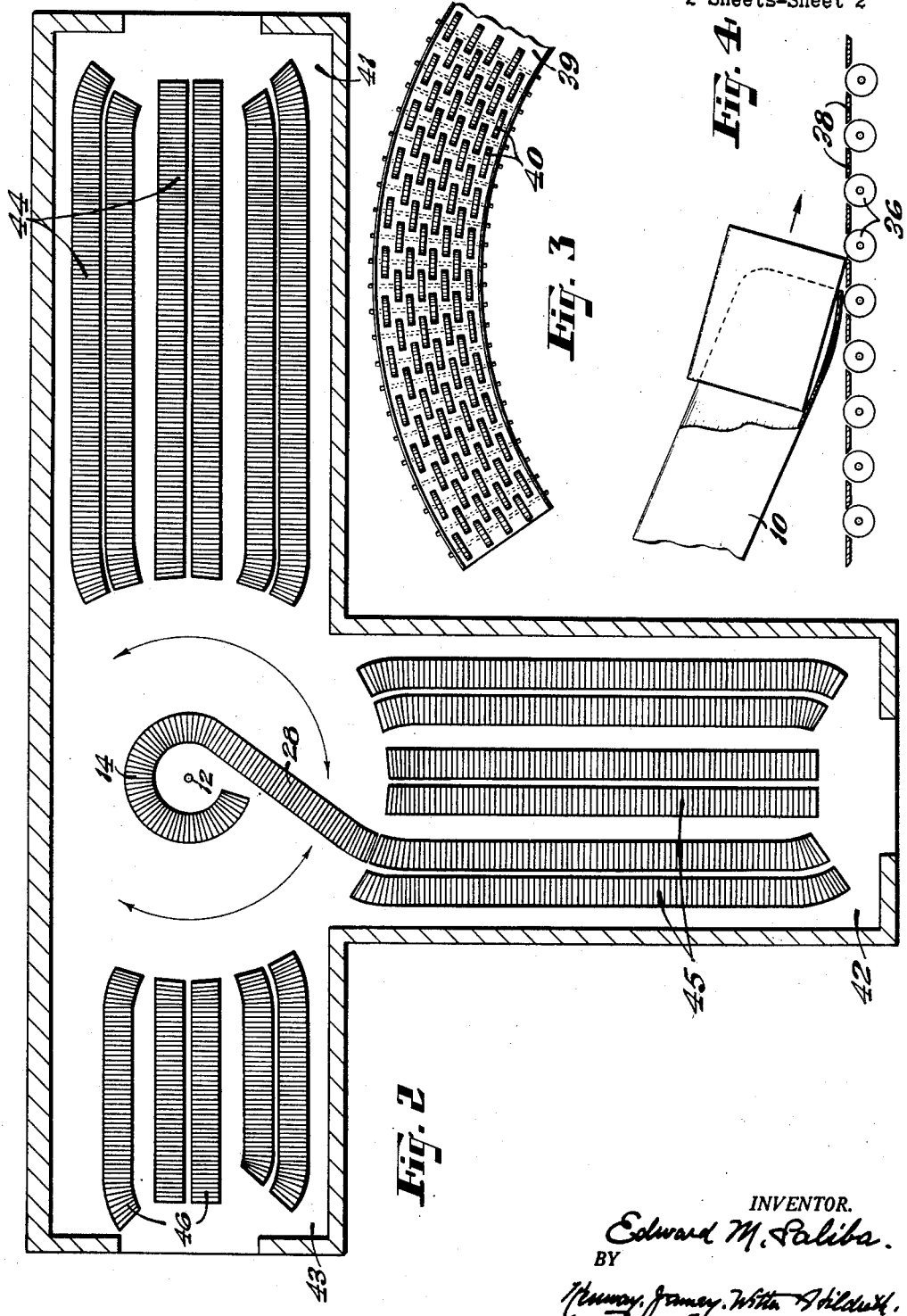

United States Patent Office 2,708,995
Patented May 24, 1955

2,708,995

DISTRIBUTING CONVEYOR

Edward M. Saliba, Andover, Mass.

Application November 10, 1950, Serial No. 195,093

6 Claims. (Cl. 193—36)

This invention relates to distributing conveyors and comprises a new and improved construction whereby merchandise may be conveniently distributed from a single chute or conveyor to any selected delivery conveyor or storage unit.

While my invention is particularly designed and adapted for handling commodities which are shipped in corrugated containers, the invention is not limited to that or any specific field.

In many factories a basic inventory of the various items produced is fed into a current daily inventory from which the orders are gathered, packaged, labeled, weighed, stamped and strapped if necessary. After this processing the packages are delivered to a power belt conveyor and transferred for distribution to any one of a large number of storage lines on the shipping dock. Packaged shipments can be made from any point located conveniently to the power belt conveyor. The present invention solves the problem of sorting and delivering packages and articles which are supplied continuously at a predetermined point by a chute or conveyor, smoothly and uninterruptedly directly to a waiting truck or trailer, or to an intermediate conveyor utilized temporarily for storage.

With these objects in view my invention in one aspect comprises a fixed delivery chute terminating above the floor level and an annular roller conveyor rotatable beneath and in registration with the delivery end of the chute and provided with a tangential run-off portion. In those cases in which the annular roller conveyor is associated with a spiral chute descending about a vertical axis, the delivery end of the chute may be disposed radially with respect to the axis, and the annular conveyor will be rotatable about the axis of the chute. Stationary delivery or storage conveyors are disposed radially about the axis of the chute, and the annular roller conveyor may be turned to direct its run-off portion to any selected delivery conveyor. In this connection locking means are provided for securing the annular roller conveyor in operative relation to any selective delivery conveyor.

Another feature of the invention relates more particularly to the construction of the annular rotatable conveyor and consists in providing surfaces between the rolls thereof which will prevent a package from striking the rolls at an unfavorable angle or from diving into the space between the rolls. This, it will be understood, is important where the delivery chute descends at a substantial angle to the plane of the angular roller conveyor.

These and other features of the invention will be best understood and appreciated from the following description of a preferred embodiment thereof, selected for purposes of illustration, and shown in the accompanying drawings, in which:

Fig. 1 is a view in perspective of the entire system;
Fig. 2 is a diagrammatic plan view;
Fig. 3 is a fragmentary plan view showing a modified form of roller conveyor; and
Fig. 4 is a fragmentary view showing the transfer of a package from the delivery chute to the annular roller conveyor.

As herein shown my invention is used in association with a stationary spiral or helical chute 10 having a supporting post 11 at its lower end and being disposed concentrically about a vertical post or spindle 12 which is the geometric axis of the spiral. The chute is connected to the post by a series of radial arms 13. The delivery end of the chute terminates at a fixed distance above the floor level and is radially disposed with reference to the axis of the chute.

Beneath the end of the chute is rotatably mounted a roller conveyor 14 having a flat arcuate portion approximately 270° in circumference having an outer frame or rim composed of circular channel irons 15 and 16. A circular channel iron 17 forms the inner rim of the roller conveyor and a circular angle iron 18 cooperates with the outer and inner rims in supplying bearings for a series of freely rotating rollers. The roller conveyor has a hub in the form of a sleeve 19 which is rotatable about the post 12 and is secured at its lower end to square plates 20 and 21. From these plates radial arms 22 extend to the circular frame of the roller conveyor.

Beneath the roller conveyor is a circular carrier ring 23 supported on truck or casters 24 running on a stationary circular track 25 resting on the floor and concentrically disposed with respect to the axis of the post 12. A system of braces including the vertical bars 26 support the roller conveyor on the carrier ring 23. The post 12 rests upon a foot plate 27.

The roller conveyor is provided with a tangential run-off portion 28 of substantial length and this is supported at its outer end by a frame 29 provided with one or more wheels 30 arranged to run on an outer circular track 31 also disposed concentrically with the axis of the post 12 and spaced from the inner track 25. An arm 32 projects from the frame 29 and below this is mounted a floor lock 33 arranged to be raised or lowered through connections with a yoke 34. The floor lock serves as a lock for the run-off portion and the annular conveyor by frictionally engaging the floor when tripped. Otherwise the annular conveyor is free to be rotated beneath the discharge end of the chute 10 so that its tangential run-off portion may be located in any desired angular position about the axis of the post 12.

The run-off portion has a single series of freely turning rolls 35 while the arcuate portion thereof is provided with an outer series of rolls 36 journaled between the outer rim and the intermediate angle iron member 18 and an inner series of rolls 37 journaled between that member and the inner rim 17. As shown in Fig. 4, baffle plates or shields 38 may be disposed between either or both series of these rolls in order to prevent boxes or other articles delivered from the chute from diving into the space between the rolls or encountering them at an angle which would interrupt the movement of the box.

An alternative construction of the roller conveyor for accomplishing the same purpose is shown in Fig. 3 where the conveyor is provided with an annular face plate 39 through which project a series of skate rolls set in staggered and overlapping relation.

Fig. 2 represents diagrammatically a typical loading dock of a design made possible by employing the roller conveyor of my invention. As herein shown, the dock comprises three rectangular bays 41, 42 and 43 disposed symmetrically and generally radially with respect to the axis of the post 12. The bay 41 is shown as containing six roller conveyors arranged side by side and having their inner ends disposed in an arc also concentric with the axis of the post 12. The outer ends of the conveyors 44 are directed toward a doorway at the end of the bay which is adapted to receive the rear end of a truck which may be loaded from any one of the conveyors 44 either directly or through the medium of any usual transferring device. Similarly, the bay 42 is provided with six roller conveyors 45 and the bay 43 with six shorter roller conveyors 46, all leading to doorways in the outer end of the bays and all arranged with their inner ends concentric with respect to the axis of the post 12 and of the roller conveyor 14. As herein shown, the tangential run-off portion 28 is brought into registration with the second conveyor 45 from the left wall of the bay 42. Accordingly, packages descending the chute 10 pass along the exposed arcuate portion of the roller conveyor 14, then outwardly along its tangentially run-off portion 28 and reach the roller conveyor 45 on which they may remain temporarily or pass directly to a waiting truck.

The exact construction of the roller conveyors 44, 45 and 46 is of secondary importance. They may be horizontal and present either freely rotating rolls or driven rolls, or they may be inclined so that packages will advance by gravity toward their delivery ends. Frequently it will be convenient to load one of these conveyors after another with a substantial accumulation of packages and then clear the conveyors at a shipping time later in the day.

It will be noted that the roller conveyor 14 as a unit may be rotated freely under the delivery end of the chute 10 and that a different length of its arcuate portion will be exposed and operative for every different position in which the tangential run-off portion is located. For example, as shown in Fig. 1 approximately 100° of the roller conveyor is exposed between the end of the chute and the beginning of the tangential run-off portion, while the remaining and temporarily inoperative 170° of the roller conveyor is located behind the delivery end of the chute and beneath the chute itself.

While the annular conveyor 14 is herein shown as equipped with freely rotating rolls 36 and 37, if desired these may be driven by a motor and sprocket chain connections as in the "power driven curve" which is a piece of commercially available apparatus. The floor lock 33 is also readily available and may be procured as a complete unit.

Having thus disclosed my invention and described in detail an illustrative embodiment thereof, I claim as new and desire to secure by Letters Patent:

1. A distributing conveyor, having, in cooperation with a fixed spiral chute, a stationary spindle concentric therewith, a sleeve rotatable thereon, a circular track concentric with respect to the spindle, a circular frame rotatable upon the track, a flat annular roller conveyor supported on the circular frame and connected to said sleeve, and a tangential run-off portion leading outwardly from the annular conveyor and rotatable as a unit therewith.

2. A distributing conveyor of the character described in claim 1 having also a locking device carried by the tangential run-off portion.

3. A distributing conveyor comprising a flat roller-carrying annular member rotatable about a fixed axis and merging into a tangential roller-carrying run-off portion which is movable as a unit therewith, a plurality of stationary conveyors radially disposed with respect to said axis and all terminating at a fixed distance from the circumference of said annular member, and a fixed chute leading to a point above and in registration with said annular member, the tangential portion thereof being of a length to bridge the space between said annular member and each stationary conveyor and uncovering a different operative length of the flat annular member in its rotary movement from one stationary conveyor to another.

4. A distributing conveyor system comprising a stationary spiral chute secured to an axial spindle, a sleeve rotatable about the spindle, plates fixed to the sleeve, circular channel irons connected to said plates and comprising the frame of a flat rotatable conveyor, radially disposed rollers journaled in said channel irons, a carrier ring disposed beneath and supporting said channel irons, trucks carried by the carrier ring, and a circular track beneath said trucks.

5. A distributing conveyor system comprising a stationary spiral chute secured to an axially disposed post and having a delivery end supported at a fixed distance above the ground, an inner circular track located concentrically about the foot of said post and an outer circular track spaced outwardly from the inner track, a conveyor having a flat circular portion supported for rotary movement on the inner track beneath but substantially at the level of the delivery end of the chute and a tangential run-off section supported for rotary movement on the outer track, whereby the operative length of circular portion of the rotary conveyor can be varied at will with simultaneous angular movement of its run-off section.

6. A distributing system as defined in claim 5 in which the flat circular portion of the conveyor has a series of spaced radially arranged rolls, and a baffle plate disposed between each pair of rolls in order to prevent articles delivered from the chute from diving into the space between the rolls.

References Cited in the file of this patent

UNITED STATES PATENTS

| 890,917 | Mathews et al. | June 16, 1908 |
| 946,880 | Schwab | Jan. 18, 1910 |
| 992,910 | Schwab | May 23, 1911 |
| 2,204,828 | Sherrill | June 18, 1940 |

FOREIGN PATENTS

| 465,477 | Germany | Sept. 19, 1928 |